United States Patent [19]

Cree et al.

[11] Patent Number: 5,093,901
[45] Date of Patent: Mar. 3, 1992

[54] SYSTEM FOR EXCHANGING ELECTRONIC CALENDARS BASED ON ENTRIES AND CLASSIFICATION AMONG USERS OF THE SYSTEM

[75] Inventors: Charles M. N. Cree; Grady J. Landry; Keith J. Scully, all of Austin, Tex.; Harinder Singh, Chapel Hill, N.C.

[73] Assignee: International Business Machines Corporation, Armonk, N.Y.

[21] Appl. No.: 252,282

[22] Filed: Sep. 30, 1988

[51] Int. Cl.$^5$ .............................................. G06F 15/40
[52] U.S. Cl. ................................. 395/100; 364/222.9; 364/237.2; 364/284.3; 364/284.4; 364/919.5; 364/927.2; 364/962.1; 364/943.5; 364/DIG. 2; 364/419
[58] Field of Search ... 364/200 MS File, 900 MS File, 364/419

[56] References Cited

U.S. PATENT DOCUMENTS

| | | | |
|---|---|---|---|
| 4,194,196 | 3/1980 | Mohiuddin . | |
| 4,591,840 | 5/1986 | Curtis et al. . | |
| 4,626,836 | 2/1986 | Curtis et al. | 340/706 |
| 4,645,238 | 2/1987 | Vincent et al. . | |
| 4,807,155 | 2/1989 | Cree et al. | 364/518 |
| 4,817,018 | 3/1989 | Cree et al. | 364/518 |
| 4,819,191 | 4/1989 | Scully et al. | 364/518 |
| 4,866,611 | 9/1989 | Cree et al. | 364/300 |
| 4,896,306 | 1/1990 | Sanbongi et al. | 368/29 |

FOREIGN PATENT DOCUMENTS 0276427 3/1988 European Pat. Off. .

OTHER PUBLICATIONS

"Time Management: Business in its Finest Hour" by B. Sudyam, *Personal Computing*, Mar. 1982.
"Time is of the Essence", by J. Rothfeder, *Personal Computing*, Jun. 1983.

Primary Examiner—Thomas C. Lee
Assistant Examiner—Ayni Mohamed
Attorney, Agent, or Firm—H. St. Julian; Casimer K. Salys

[57] ABSTRACT

A method of exchanging entries on calendars being maintained by a first and a second calendar users. An event is automatically scheduled on a second calendar if a classification which is associated with the event is higher than any previous scheduled event for the same time slot. A reply is prepared and transmitted to the first calendar user which requested the scheduling of the vent regarding the status of the second user in regards to the scheduled event. Subsequently, if the status of the second user changes in regards to the event, a subsequent reply is prepared and transmitted to the first user setting forth the changed status.

9 Claims, 8 Drawing Sheets

SYSTEM FOR EXCHANGING ELECTRONIC CALENDARS BASED ON ENTRIES AND CLASSIFICATION AMONG USERS OF THE SYSTEM

DESCRIPTION

1. Field of Invention

This invention relates in general to electronic calendaring methods, and in particular, to methods of exchanging calendar entries from different calendars.

2. Background Information:

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems. Hence, the term "electronic calendaring."

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring methods generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network. Usually these networks have been established to permit the users to interact with each other and with data maintained on the system. In this environment, a user at a terminal or workstation can send a message to one or more of the other users on the network concurrently, and is notified when the addressees have received and read the message. In most of these environments, each user generally maintains a calendar, and in many of these environments the reason for having a network in which users interact, quite often involves user interaction that requires reference to the respective electronic calendars of the users. A considerable amount of time is therefore spent by calendar users in many organizations, with people checking and rearranging their calendars to accommodate various events such as meetings and presentations. Calendar systems have progressed to the point where a person who is calling a meeting can at least view the calendars of a number of users that he intends to invite to a meeting, in order to determine a common available time for the meeting.

In this prior art system, a screen is presented to the meeting originator which requests the data necessary for the system to determine times that all potential attendees would be available. The data requested includes, for example, the length of the meeting, a time period during which the meeting should be conducted, the place of the meeting and the names of the attendees. Based on this data, the method returns a screen of available times after inspecting each attendee's day calendar during the time period for free time slots or periods.

The originator then selects the beginning time and end time of the meeting, including the time and date, and invitations are automatically sent to all the attendees, requesting their attendance at the scheduled meeting.

While such an automatic system saves time in finding a convenient meeting time, relative to the manual process, the process is limited to the scheduling of meetings based on "free time" as represented by the absence of a calendar entry on each of the inspected calendars. This approach does not recognize that some calendar entries are less important than others and, in practice, it is often impossible to find a common period of "free time" for a meeting that involves a large group of people or a meeting involving a number of people whose work requires a large number of meetings.

The prior art systems are limited to examining calendars of others in connection with setting up a meeting. It was soon recognized that there were other situations besides calling a meeting where it would be beneficial to be able to create a "selected view" of a number of individual calendars.

A department manager, for example, may have an assignment that can be given to a number of different people in his department. If the calendaring system could display to the manager the calendared events of each of these people which meet a set of search criteria entered into this system interactively by the manager, considerable time and effort could be saved by everyone involved. While time available or free time may be one of the search criteria entered, other criteria such as the relative importance of the events that are calendared to the new assignment, might also provide the manager with more relevant data than just free time. Also, identifying the person who handled the same or similar assignment in the past, similar assignments scheduled in the future or other assignments scheduled at the same geographic location or customer could be important criteria for the manager to employ. These deficiencies of the prior art electronic calendaring methods, namely using only free time to find relevant calendar entries, are overcome by the present invention.

DISCLOSURE OF THE INVENTION

This invention relates to methods of exchanging entries in a plurality of calendars being maintained on an information processing system. The invention enables an end user (invitor) who maintains a calendar on the information processing system to schedule a meeting and invite other end users (invitees) who maintain respective calendars on the system to the meeting. The invitor sends each of the invitees a meeting notice or request. The current status of each of the respective invitees is determined in response to receipt of the meeting notice and an entry for the scheduled meeting is automatically entered on the calendar of each invitee based upon the classification of the invitee as set forth in the meeting notice. A log is maintained of each entry or attempted entry and its associated status for the invitor and each of the respective invitees. A reply, which sets forth the invitee's status in regard to the schedule meeting, is prepared and transmitted to the invitor. Subsequently, if a selected invitee's status changes in regard to the scheduled meeting, the invitee's calendar is automatically updated and the invitor is automatically informed of this status change.

BEST MODE FOR CARRYING OUT THE INVENTION

Figure 1:
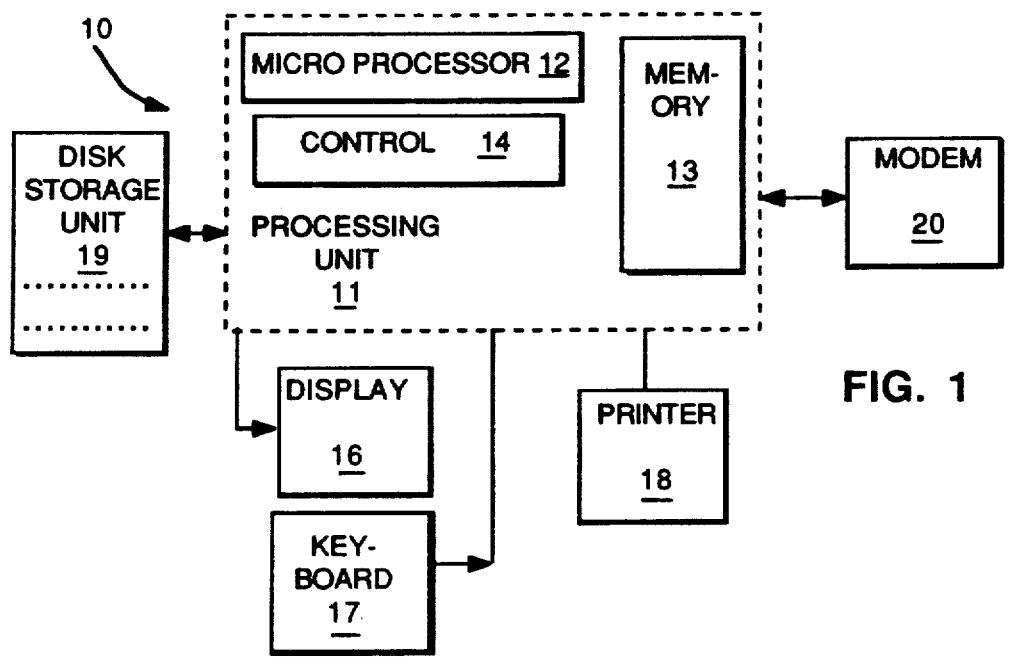
FIG. 1 illustrates an interactive workstation in which the method of the present invention may be advantageously employed.

FIG. 1 illustrates the functional components of an interactive type data processing workstation or terminal 10 on which the electronic calendaring method of the present invention may be advantageously employed. The terminal 10 comprises a processing unit 11 which includes a microprocessor block 12, a semiconductor memory 13, and a control block 14 which functions to control input/output operations in addition to the interaction between the micro-processor block 12 and the memory unit 13.

The terminal 10 further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal 10, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal 10 shown in FIG. 1 further includes a printer 18, which functions to provide hard copy output of data developed or stored in the terminal 10. Lastly, the modem 20 functions to transfer data from the terminal of FIG. 1 to a host system through one or more communication links which may be a commercial type link or a dedicated communication link.

Figure 2:
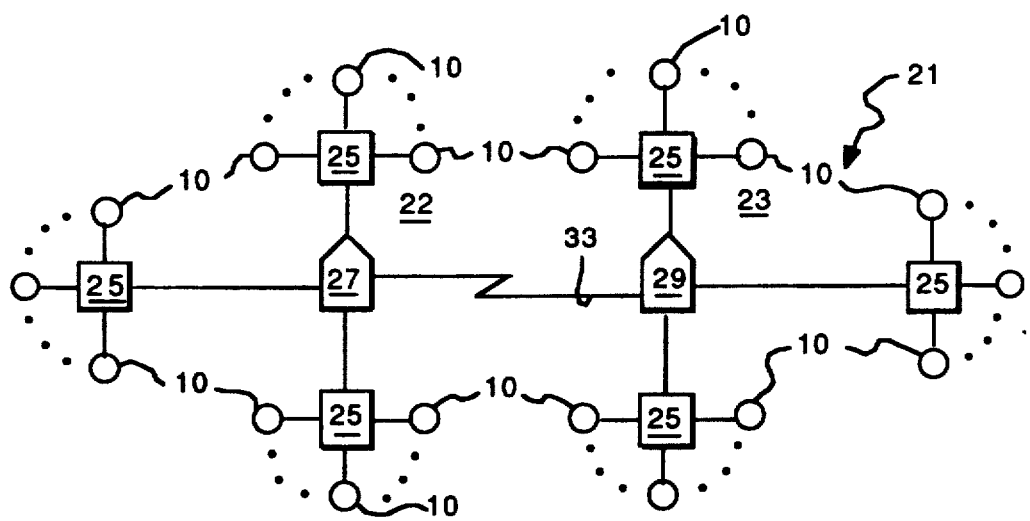
FIG. 2 illustrates an information processing system having a plurality of networks which include the interactive workstations of FIG. 1.

FIG. 2 illustrates an information processing system 21 having a first network 22 and a second network 23. Each of the networks 22 and 23 includes a plurality of nodes 25 incorporated therein. The networks 22 and 23 also include host central processing unit 27 and 29, respectively. As illustrated, a plurality of interactive terminals 10 of the type shown in FIG. 1 are interconnected with each other within each of the networks 22 and 23 through the respective host processing units 27 and 29, respectively. The networks 22 and 23 are coupled together via a communication link 33. Functionally, each of the networks 22 and 23 operates to allow one terminal to communicate with one or more terminals within the information processing system 21 using established communication protocols, so that the various serially connected communication links are transparent to an end-user. Such communication systems are well known in the art and are currently in extensive commercial use. Since these communication links per se are not a part of the present invention, only those details that are necessary for an understanding of the method of calendaring an event in the present invention will be described. It should therefore be assumed in the following description, that each interactive terminal 10 in the information processing system 21 has a system node address and a terminal address and that to simplify the description, there is only one individual assigned to each of the terminals within the information processing system. It should further be assumed that conventional communication services are provided by the networks 22 and 23, such as directory listings of individual calendar owners and shareable resources such as meeting rooms, etc., which require scheduling.

The information processing system 21 shown in FIG. 2 processes information as various types of data objects such as text data objects, graphic data objects, and calendar data objects. Each of these data objects are represented by a datastream which comprises a series of structured fields.

The present invention provides communication logic which is necessary to schedule meetings, to respond to meeting invitations and to reschedule or cancel meetings in an automatic manner. For purposes of illustration, at least two end user must maintain calendars on either or the same one of the networks 22 and 23. Moreover, the calendars being maintained on the networks 22 and 23 are available to the communication logic so that access is invisible to the end users or calendar owners. Thus, each of the end users are allowed to schedule calendar events on the other's calendar.

A typical application of the present invention is to invite selected individuals to a meeting which has been scheduled. An end user or caller of the scheduled meeting sets up a distribution list of invitees and the roles associated with attendance status. These roles include key attendee, invitee, caller/arranger of the meeting, alternate, additional attendee, receives copy, blind copy, blind copy/invitee. A link is established to invite the selected individuals on the distribution list to the meeting and to accept the individual responses of the meeting invitation. The individual responses, such as "would be attending", "not attending", "sending alternate", "tentative for the meeting" and "user acknowledge", are stored as part of the status of the scheduled meeting.

In the preferred embodiment of the present invention, there are three types of invitees to any regularly scheduled meeting: normal, regular and key. A normal invitee is an individual who is invited to this regularly scheduled meeting for the first and possibly the only time. A regular invitee is an individual who is invited to this regularly scheduled meeting as is normally done for this date and time. A key invitee is an individual who is invited to this regularly scheduled meeting as is normally done or for the first and only time. The meeting will be cancelled or rescheduled if the key invitee can not attend.

In response to the receipt of the invitation to the regularly scheduled meeting, the status or response of a recipient of the invitation is indicated as:

Recorded - The meeting invitation was received and the recipient either acknowledges this or simply records the meeting notice on the recipient's calendar.

Tentative Accept: The recipient has agreed to tentatively attend the meeting.

Accepted (Automatic): The recipient has agreed to attend the meeting via some preset response mechanism.

Accepted (Explicit or Choice): The recipient has agreed to attend the meeting via a manually generated response.

Tentative Reject (Conflict): Recipient has tentatively rejected attending the meeting because of a conflict which may or may not be resolved.

Rejected (Conflict): Recipient has automatically rejected attending the meeting because of a conflict which can not be resolved.

Rejected (Explicit): Recipient has manually rejected attending the meeting because of a conflict which can not be resolved.

Shown in Tables 1 and 2 are state diagrams of various scenarios showing the status of n invitee in response to the meeting notice.

TABLE 1

| | | | |
|---|---|---|---|
| Multiple Active Entries | No | No | Yes |
| New Entry Key or Regular | Yes | No | — |
| New Entry Normal | No | Yes | — |
| Tentative Accept Procedure | | X | |
| Automatic Accept Procedure | X | | |
| Go to Table 2 | | | X |

TABLE 2

| | | | | | | | | |
|---|---|---|---|---|---|---|---|---|
| Current Accept (Choice) | Yes | No | No | No | No | No | No | No |
| Current Accept (Auto) | — | Yes | Yes | Yes | No | No | No | No |
| Current Tentative Accept | — | — | — | — | Yes | Yes | No | No |
| New Entry Key | — | Yes | Yes | No | — | — | — | — |
| Current Regular | — | No | Yes | — | — | — | — | — |
| New Entry Normal | — | — | — | — | No | Yes | Yes | No |
| Tent. Reject Proc. (old) | | | X | | X | | | |
| Tent. Reject Proc. (new) | X | X | | X | | X | | |
| Auto Accept Proc. (new) | | | X | | X | | | X |
| Tent. Accept (new) | | | | | | | X | |

As noted above, all invitees to a regularly scheduled meeting or recipients of a meeting notice ar classified as a key, a regular or a normal invitee. A meeting will be automatically scheduled on an invitee's/recipient's calendar within the information processing system 21 (FIG. 1) if the invitee's/recipient's classification in the scheduled meeting is higher than that of a previously scheduled meeting on the recipient's calendar for the same date and time. Referring to the state diagram shown in Table 1, the first column sets forth a scenario whereby the recipient does not have any multiple active or previous entries for the date and time set forth in a new meeting invitation and the new invitation classifies the recipient as a key or a regular invitee. An automatic acceptance procedure is then transmitted to the caller/arranger of the new meeting and the new meeting is scheduled on the recipient's calendar.

The second column of Table 1 sets forth the scenario whereby the recipient does not have any multiple active entries and the new invitation classifies the recipient as a normal invitee. A tentative acceptance procedure is transmitted to the caller/arranger of the new meeting and the new meeting is tentatively scheduled on the recipient's calendar.

If the recipient's calendar includes multiple active entries for the time and date specified in the new meeting notice, Table 2 sets forth a state diagram which illustrates various scenarios and the recipient's response to the new meeting. In the first column of Table 2, the recipient has explicitly chosen to attend a particular meeting for the time and date specified in the meeting notice. In view of this explicit choice, all new invitations to meetings, irrespective of the classification, will be tentatively rejected. Thus, the tentative rejection procedure is transmitted to the caller/arranger of the new meeting.

Column two of Table 2 sets forth a scenario whereby the recipient currently has an automatic acceptance to a meeting which classifies the recipient as a key or a regular invitee and the new meeting notice classifies the recipient as a key invitee. Column two also sets forth that the current acceptance is not classified as a regular invitee. Since the classification of the current acceptance is the same as the classification set forth in the new meeting notice, the tentative reject procedure is transmitted to the caller/arranger of the new meeting.

Column three of Table 2 sets forth a scenario whereby the recipient currently has an automatic acceptance with the recipient classified as a regular invitee and a new invitation which classifies the recipient as a key invitee. A tentative reject procedure is transmitted to the caller/arranger of the current meeting, an automatic acceptance procedure is transmitted to the caller/arranger of the new meeting and the new meeting is scheduled on the recipient's calendar.

Column four sets forth a scenario whereby the recipient currently has an automatic acceptance which classifies the recipient as a key or a regular invitee and the new invitation classifies the recipient as a regular or a normal invitee. The tentative reject procedure is transmitted to the caller/arranger of the new meeting because the classification of the new meeting does not exceed that of the classification of the current acceptance.

Column five sets forth a scenario whereby the recipient currently has a tentative acceptance which classifies the recipient as a normal invitee and the new invitation classifies the recipient as a key or a regular invitee. The tentative reject procedure is transmitted to the caller/arranger of the current meeting, the automatic accept procedure is transmitted to the caller/arranger of the new meeting and the new meeting is scheduled on the recipient's calendar.

Column six sets forth a scenario whereby the recipient has a current tentative acceptance with the recipient classified as a normal invitee and the new invitation also classifies the recipient as a normal invitee. The tentative reject procedure is transmitted to the caller/arranger of the new meeting.

Columns seven and eight set forth scenarios whereby the recipient of the new meeting notice currently does not have an automatic acceptance or a tentative acceptance. In column seven, the new invitation classifies the recipient as a normal invitee. The tentative accept procedure is then transmitted to the caller/arranger of the new meeting and the new meeting is tentatively scheduled on the recipient's calendar. In column eight, the new invitation classifies the recipient as a key or a regular invitee. The automatic acceptance procedure is transmitted to the caller/arranger of the new meeting and the new meeting is scheduled on the recipient's calendar.

Set out below is an illustration of a calendar program for generating the exchanging entries in a plurality of calendars being maintained in the information processing system 21. The calendar program is in program design language from which source code and machine code are derivable. In the present invention, it is to be assumed that system 21 is under mouse and keyboard device control. Moreover, it is to be assumed that the calendar program is invoked from a user application which facilitates a user in the system 21 to access at least two calendars being maintained in the system. Additionally, the calendar program is able to activate an electronic mail system, such as the PROFS system which is commercially available from the International Business Machines Corporation. Since the user application and the electronic application is not essential to the present invention, they will not be described in detail.

BEGIN CALENDAR MAIN PROC

The user application invokes one of a plurality of calendar functions such as schedule a meeting, invite user to a meeting, accept a meeting invitation, reject a meeting invitation, change meeting attendance status, etc. The invoked calendar function will update the user's local calendar to establish a meeting and then return control to the user application.

```
IF THE MAIL SERVICE NEEDS TO BE INVOKED FOR ANY
    ITEM SUCH AS INVITING PEOPLE TO A MEETING
    THEN INVOKE SENDING MAIL SERVICE
ENDIF
DO IN RESPONSE TO A CALENDAR REQUEST BEING
    RECEIVED, THE INFORMATION PROCESSING
    SYSTEM DETERMINES FOR EACH INVITEE
    WHETHER THE CALENDAR SERVICE IS
    TO BE INVOKED
ENDDO
IF A REQUEST TO SCHEDULE REGULAR MEETINGS,
INVITE
    USERS/INVITEES TO A MTG, EXECUTE A FREE
    TIME SEARCH, ACCEPT A MTG INVITATION,
    REJECT A MTG INVITATION, SEND AN
    ALTERNATE TO A MEETING,
    CHANGE MTG ATTENDANCE STATUS, OR CANCEL
    A MTG IS RECEIVED
        THEN PASS CONTROL TO THE APPROPRIATE
        ROUTINE TO ACCOMPLISH THE TASK
        ELSE ANOTHER TYPE OF MAIL REQUEST IS
        PROCESSED.
ENDIF
    (Control is returned to this point after
    calling the appropriate subroutine)
    IF THE RETURN CODE FROM THE CALENDAR
        PROCESS IS ENQUEUE THE REQUEST
            THEN ENQUEUE THE REQUEST AND TEST
            FOR THE END OF THE TASK
        ELSE
            IF THE RETURN CODE INDICATES
            TASK COMPLETE (DONE)
                THEN TEST FOR END OF TASK
                ELSE BUILD A STATUS RECORD TO
                INDICATE SOME OTHER TYPE
                OF STATUS
                TRANSMIT THE STATUS TO
                CALLER/ARRANGER
            ENDIF
    ENDIF
    IF ALL INVITEES/RECIPIENTS HAVE BEEN
    PROCESSED
        THEN RETURN CONTROL TO THE SYSTEM
        ELSE POINT TO THE NEXT INVITEE/
        RECIPIENT AND
            RETURN CONTROL TO THE SYSTEM
            TO DETERMINE
            THE PROCESS TO BE INVOKED FOR THE
            NEXT INVITEE/RECIPIENT
    ENDIF
END CALENDAR MAIN PROC
BEGIN MEETING SUBROUTINE
    ADD THE NEW ENTRY TO THE INVITEE'S
    CALENDAR IF THERE ARE NO MULTIPLE
    ACTIVE ENTRIES THEN
        IF THE NEW PRIMARY STATUS = NORMAL
        MTG
            THEN SET CURRENT PRIMARY STATUS =
            NORMAL TENTATIVE ACCEPT AND
            PREPARE A TENTATIVE ACCEPT REPLY
        ELSE SET CURRENT PRIMARY STATUS = TO
        THE CURRENT STATUS (KEY OR REGULAR)
        SET NEW ENTRY AND CURRENT
        SECONDARY STATUS = ACCEPT (AUTO)
        AND PREPARE AN ACCEPT (AUTO) REPLY
        ENDIF
    ELSE
        IF THE CURRENT SECONDARY STATUS =
        ACCEPT BY CHOICE
            THEN SET THE NEW SECONDARY
            STATUS =
```

```
            TENTATIVE REJECT AND PREPARE A
              TENTATIVE REJECT REPLY
         ELSE
           IF THE CURRENT SECONDARY
             STATUS = ACCEPT
             (AUTO) THEN
             IF PRIMARY STATUS = KEY
               THEN
                 IF CURRENT PRIMARY STATUS =
                   REGULAR
                   THEN SET CURRENT PRIMARY
                   STATUS
                     = THE NEW PRIMARY STATUS, SET
                     CURRENT & NEW ENTRY SECONDARY
                     STATUS = ACCEPT (AUTO,) SET
                     PREVIOUS CURRENT SECONDARY
                     STATUS = TENTATIVE REJECT,
                     SEND TENTATIVE REJECT REPLY
                     TO PREVIOUS INVITOR AND
                     PREPARE ACCEPT (AUTO) REPLY
                   ELSE SET THE NEW SECONDARY
                   STATUS
                     = TENTATIVE REJECT AND
                     PREPARE A TENTATIVE REJECT
                     REPLY
                 ENDIF
               ELSE SET THE NEW SECONDARY
                 STATUS =
                 TENTATIVE REJECT AND PREPARE A
                 TENTATIVE REJECT REPLY
             ENDIF
           ELSE
             IF THE CURRENT SECONDARY STATUS =
               TENTATIVE ACCEPT THEN
               IF NEW PRIMARY STATUS =
                 NORMAL THEN SET THE NEW
                 SECONDARY STATUS =
                 TENTATIVE REJECT AND
                 PREPARE A TENTATIVE REJECT
                 REPLY
               ELSE SET CURRENT PRIMARY
                 STATUS = THE NEW PRIMARY
                 STATUS, SET CURRENT & NEW
                 ENTRY SECONDARY STATUS =
                 ACCEPT (AUTO), SET PREVIOUS
                 CURRENT SECONDARY STATUS =
                 TENTATIVE REJECT, SEND
                 TENTATIVE REJECT REPLY TO
                 PREVIOUS INVITOR AND
                 PREPARE ACCEPT (AUTO) REPLY
               ENDIF
             ELSE
               IF NEW PRIMARY STATUS =
                 NORMAL THEN SET THE NEW
                 SECONDARY STATUS =
                 TENTATIVE ACCEPT AND
                 PREPARE A TENTATIVE ACCEPT
                 REPLY
               ELSE SET NEW SECONDARY STATUS
                 = ACCEPT (AUTO) AND PREPARE
                 ACCEPT (AUTO) REPLY
               ENDIF
             ENDIF
           ENDIF
         ENDIF
       ENDIF
       SEND PREPARED REPLY TO INVITOR/CALLER,
       MAIL CALENDAR ALERT TO INVITEE
       SET THE CURRENT POINTER TO THE NEW
       ENTRY, SET
         RETURN CODE = DONE AND RETURN TO
         THE CALLING (CALENDAR) ROUTINE
END MEETING SUBROUTINE
BEGIN CANCEL SUBROUTINE
       LOCATE THE MEETING ON THE INVITEES'
       CALENDAR IF THE MEETING IS NOT FOUND
         THEN ENTER A CANCELLED MEETING
         NOTICE ONTO THE INVITEE'S CALENDAR
       ELSE MARK THE SUBJECT MEETING
         CANCELLED ON THE INVITEE'S CALENDAR,
         SEND A CALENDAR ALERT TO THE INVITEE,
         SET THE RETURN CODE = DONE FOR
         ANALYSIS AND RESPONSE ON RETURN
         AND RETURN CONTROL TO THE
         CALLING (CALENDAR) ROUTINE
       ENDIF
END CANCEL SUBROUTINE
BEGIN REPLY SUBROUTINE
       LOCATE THE MEETING ON THE INVITEES'
       CALENDAR IF THE MEETING IS NOT FOUND
         THEN SET THE RETURN CODE TO
         ENQUEUE AND RETURN TO THE CALLING
         (CALENDAR) ROUTINE
       ELSE UPDATE THE REPLIER'S MEETING
         ATTENDANCE STATUS PER THE REPLY,
         SEND A CALENDAR ALERT TO THE INVITEE
         SET THE RETURN CODE = DONE FOR
         ANALYSIS AND RESPONSE ON RETURN
         AND RETURN CONTROL TO THE CALLING
         (CALENDAR) ROUTINE
       ENDIF
END REPLY SUBROUTINE
BEGIN FREE TIME SEARCH SUBROUTINE
       DETERMINE THE TIME SPAN FOR THE
       FREE TIME SEARCH DETERMINE THE
       LENGTH OF FREE TIME NEEDED (TIME
         INCREMENT)
       CHECK THE CURRENT TIME
       INCREMENT IN THE TIME SPAN
         FOR OPEN TIME
       IF THE INCREMENT IS OPEN (FREE)
         THEN MARK THE TIME OPEN IN A
         TIME BIT MAP
       ELSE MARK TIME INCREMENT USED IN THE
         TIME BIT MAP
       ENDIF
       MOVE THE POINTER TO THE NEXT TIME
       INCREMENT
       IF ALL TIME INCREMENTS IN THE TIME
         SPAN HAVE NOT BEEN CHECKED
         THEN CONTINUE THE SEARCH
       ELSE TRANSMIT THE COMPLETED TIME BIT
         MAP INDICATING USED AND FREE TIME TO
         THE REQUESTOR
         SET THE RETURN CODE
         TO DONE AND RETURN CONTROL TO CALLING
         (CALENDAR) ROUTINE
       ENDIF
END FREE TIME SEARCH SUBROUTINE
```

Figure 3:
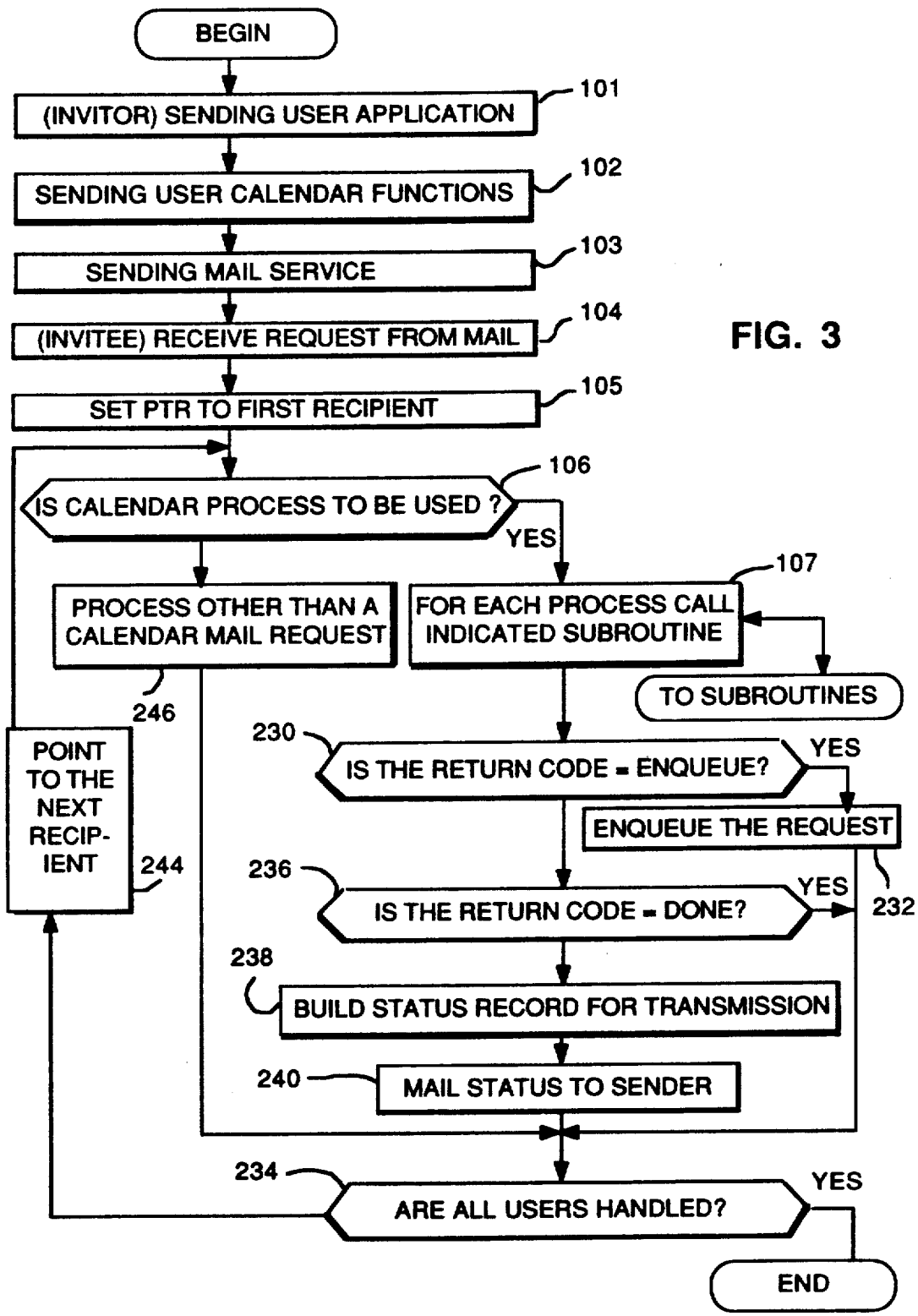
FIG. 3 through 9 are flow charts, illustrating the detailed steps of method of the present invention.
Figure 4:
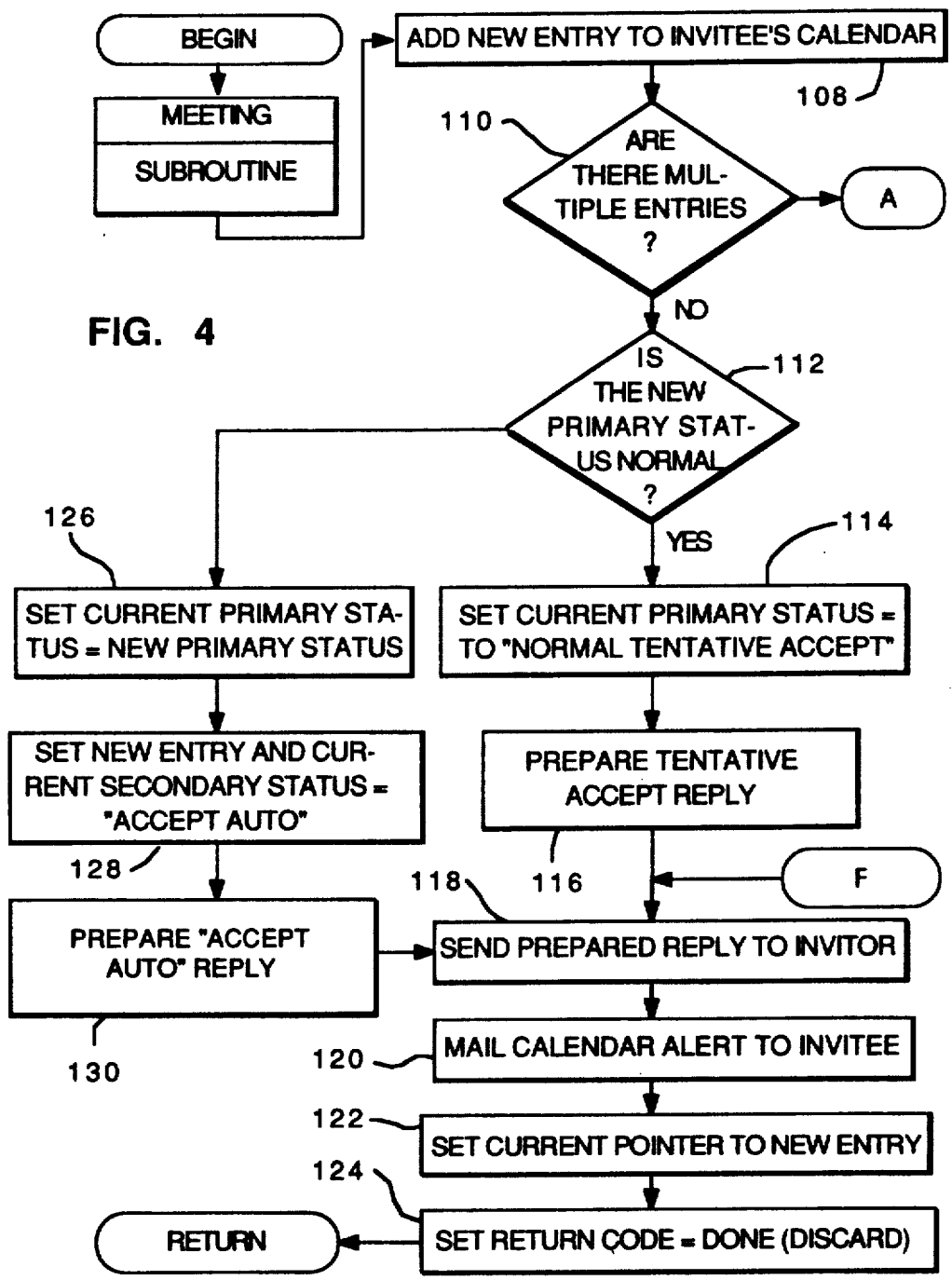

Referring to FIGS. 3 through 9, there is shown a plurality of flow diagrams which illustrate the operations of system 21 (FIG. 2) in exchanging entries between a plurality of calendars being maintained in the system. In step 101, an invitor/caller/arranger of a meeting utilizes the user application to invoke one of a plurality of calendar functions. In step 102, the invoked calendar function will update the invitor's local calendar in response to the calendar function to be performed and then return control to the user application. In step 103, control is passed to the invitor's electronic mail service if required by the invoked calendar function, such as sending a meeting notice or request to attend a meeting to a plurality of invitees to a meeting being scheduled by the invitor. An invitee's mail service receives the request in step 104 and sets a pointer to a first invitee's/recipient's address within the system 21 in step 105. Thereafter, step 106 determines whether a calendar process is to be performed for the first invitee/recipient. If the request is a calendar request, step 107 calls one of a plurality of subroutines which is required to perform the calendar request. The plurality of subroutines include functions to schedule a meeting, cancel a meeting, reply to a meeting request or a free time search of the invitee's calendar. If the calendar request is to schedule a meeting, control is transferred from step 107 to step 108 (FIG. 4).

In scheduling the meeting, the calendar request/meeting notice includes a new entry to be placed on the invitee's calendar. In step 108, the new entry is added to the invitee's calendar. Step 110 determines whether there are any previous/multiple active entries such as more than one meeting invitation for the time slot set forth in the meeting notice. If there are no multiple entries for the time slot set forth in the meeting notice, step 112 determines whether the new entry classifies the invitee as a "normal invitee" or is the primary status of the invitee in the meeting notice "normal". Steps 114, 116 and 118 sets a current primary status equal to "normal", prepares and transmits a tentative accept reply to the invitor, respectively. A calendar alert is sent to the invitee utilizing the mail service in step 120. Step 122 sets a current pointer to the new entry. A return code is set to DONE in step 124 and control is then returned to step 107.

If the primary status of the invitee in step 112 was not normal then the primary status is either key or regular. Step 126 sets the current primary status to the status which is set forth in the meeting notice. Step 128 sets the new entry and current secondary status equal to automatic accept. An automatic acceptance reply is prepared in step 130 and transmitted to the invitor in step 118. Thereafter, a calendar alert is sent to the invitee utilizing the mail service in step 120, step 122 sets the current pointer to the new entry, a return code is set to DONE in step 124 and control is then returned to step 107.

Figure 5:
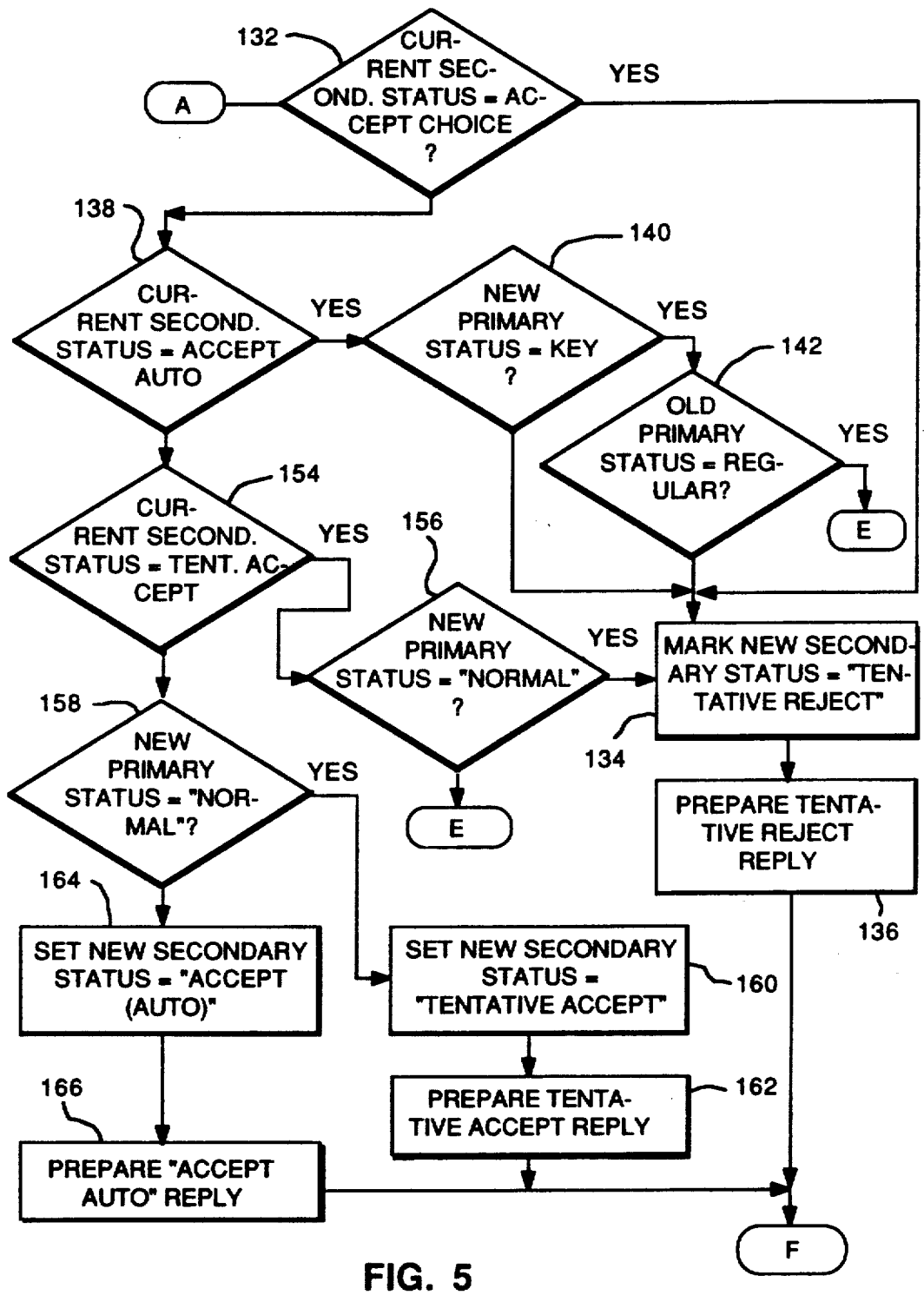
Figure 6:
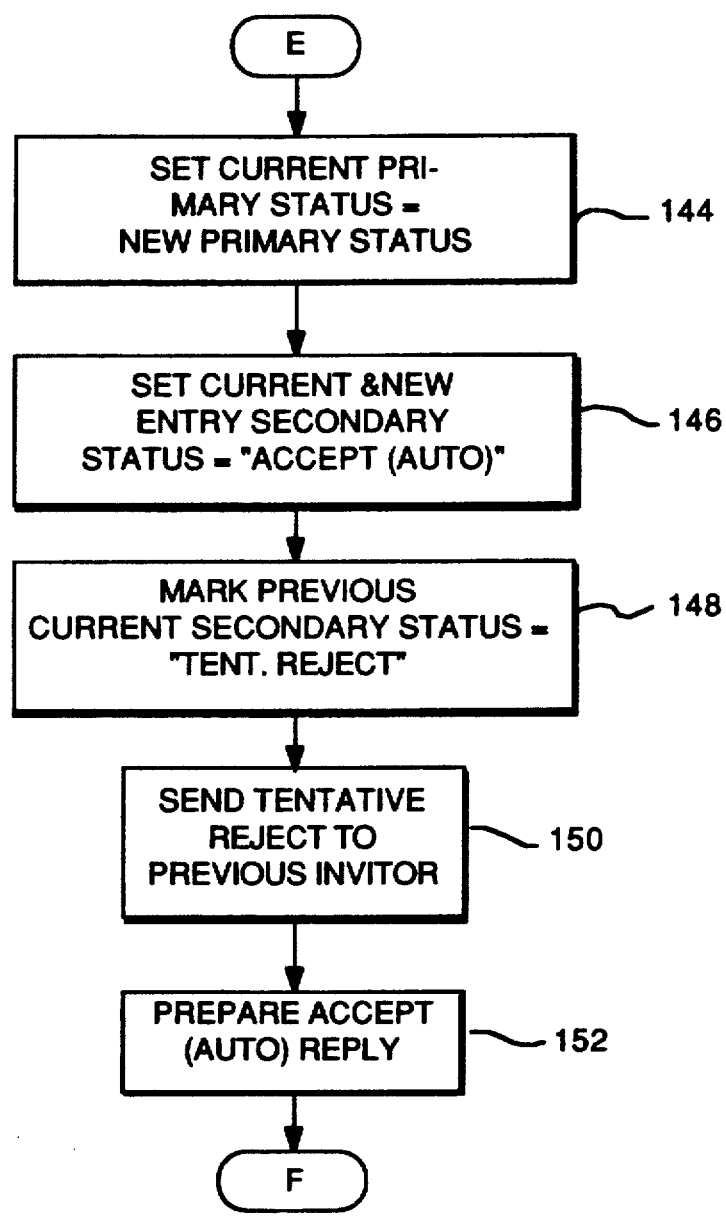

If there were multiple active entries on the invitee's calendar in step 110, control is transferred to step 132 (FIG. 5). Step 132 determines whether the current secondary status is equal to "accept choice" which indicates that the invitee has explicitly chosen to attend a particular meeting and meeting invitations received thereafter will be tentatively rejected. Thus, step 134 marks a new secondary status set to "tentative reject" and step 136 prepares the tentative reject reply and control is transferred to step 118 (FIG. 4) to send the reply to the invitor. It should be noted that the new secondary status is marked and not discarded. Thus, the present invention maintains a record or history of all the transactions involving the invitee's calendar.

Step 138 determines whether the current secondary status is equal to "automatic accept". Step 140 determines whether a new primary status, which is associated with the new entry, is equal to "key" subsequent to the current secondary status being equal to "automatic accept". If the determination in step 140 is negative, control is transferred to step 134 whereby the new secondary status, which is associated with the new entry, is marked "tentative reject". As noted above, the new secondary status is marked and not discarded. Thus, the present invention maintains a record or history of all the transactions involving the invitee's calendar.

If the current primary status is equal to key in step 140, step 142 determines whether the current primary status, which is associated with a current entry for the same time span as the new entry on the invitee's calendar, is equal to regular. If the current primary status is not equal to regular, the current primary status is equal to key in view of the current secondary status being equal to automatic accept. Thus, control is transferred to step 134 to tentatively reject the new meeting invitation. Otherwise, if the current primary status is equal to regular, control is transferred to step 144 (FIG. 6) whereby the current primary status is set equal to the new primary status. Step 146 sets the current and the new entry secondary status equal to "automatic accept". The previous current secondary status is marked "tentative reject" for record purposes in step 148. Step 150 facilitates the transmittal of a tentative reject reply to the previous invitor. An automatic accept reply is prepared in step 152 and control is then transferred to step 118 (FIG. 4) which facilitates the transmittal of the automatic accept reply to the invitor of the meeting being scheduled.

If the current secondary status was not equal to "auto accept" in step 138, step 154 determines whether the current secondary status is equal to "tentative accept". As noted above, the current secondary status which is equal to "tentative accept" is associated with a current primary status which is equal to normal. Thus, if the current secondary status is equal to "tentative accept", step 156 determines whether the new primary status is equal to normal. If the determination in step 156 is negative, then the new primary status is equal to key or regular and control is transferred to step 144 (FIG. 6) for processing as noted above. Otherwise, control is transferred from step 156 to step 134 for processing as noted above.

If the determination in step 154 is negative, step 158 determines whether the new primary status is equal to normal. Step 160 sets the new secondary status equal to "tentative accept" if the primary status is equal to normal. Thereafter, a tentative accept reply is prepared in step 162 and control is transferred to step 118 (FIG. 4) for processing as noted above. Otherwise, if the new primary status is not equal to normal, step 164 sets the new secondary status equal to "automatic accept" and an automatic accept reply is prepared in step 166. Control is then transferred from step 166 to step 118 (FIG. 4) for processing as noted above.

Figure 7:
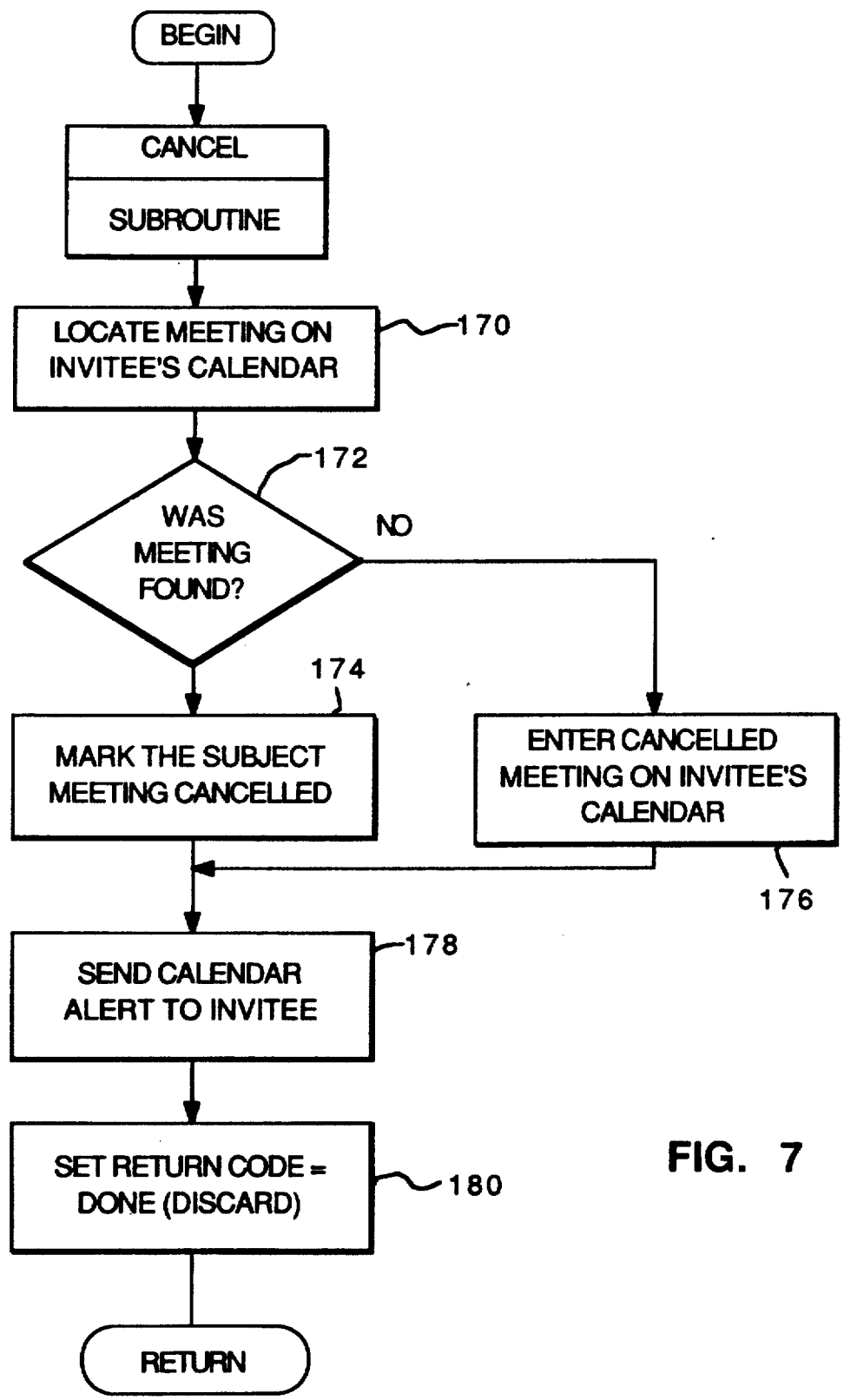

Referring to FIG. 7, there is shown a flow diagram for a cancel subroutine which facilitates the cancellation of a previous scheduled meeting on calendars being maintained within the information processing system 21 (FIG. 2). Steps 170 and 172 facilitate the location of the scheduled meeting on the calendars associated with the invitees of the meeting. If the meeting was located on the respective calendars, the scheduled meeting is marked cancelled on the respective invitee's calendar in step 174 and a calendar alert is transmitted to the respective invitees utilizing the mail service in step 178 to notify the respective invitee of the change which was made on the associated calendar. However, if the meeting was not located in step 172, a cancelled meeting entry is made on the respective invitee's calendar for information purposes. Step 180 sets a return code equal to DONE and control is returned to step 107 (FIG. 3) for further processing.

Figure 8:
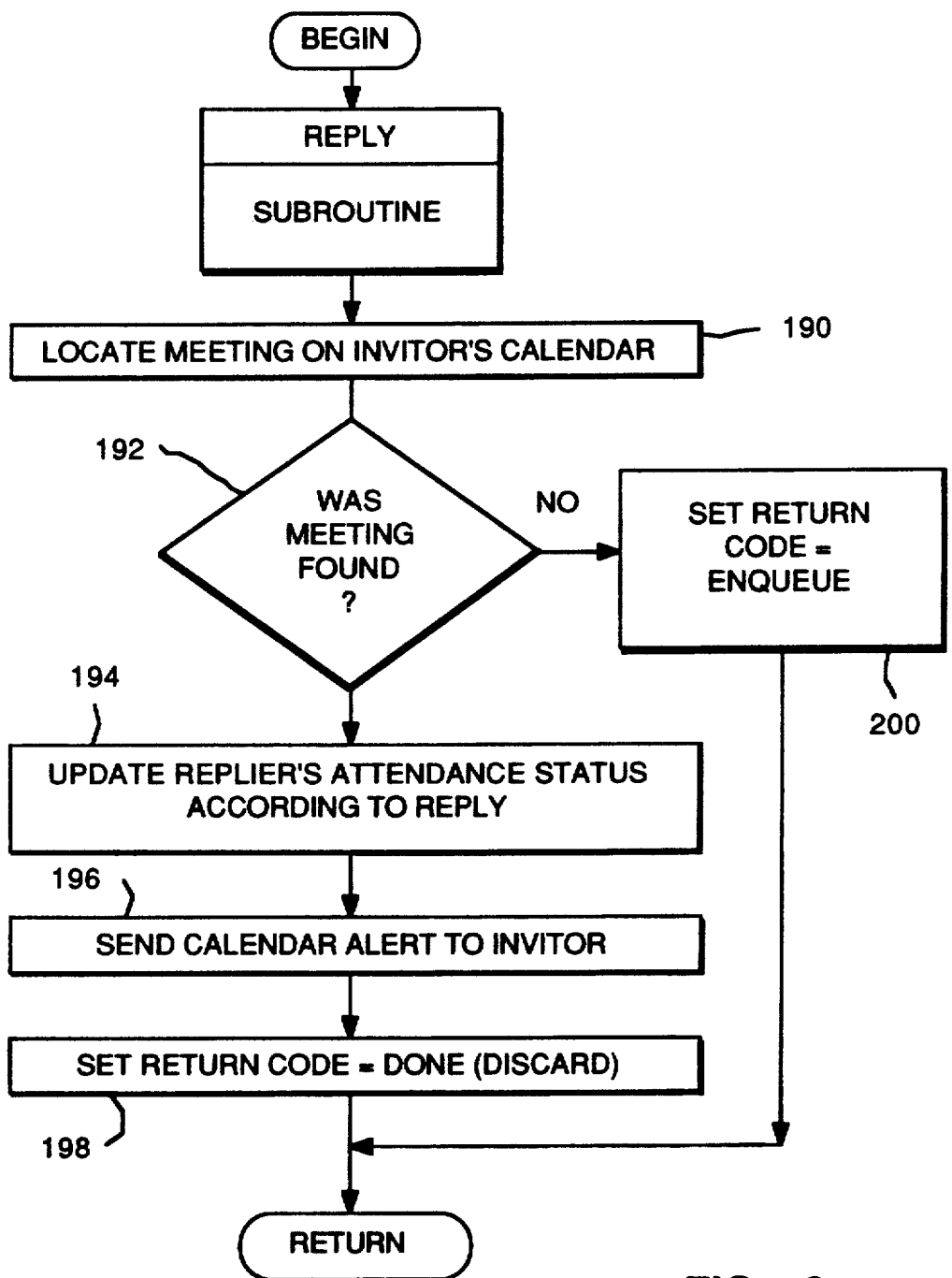

Referring to FIG. 8, there is shown a flow diagram for a reply subroutine which facilitates the notification of the invitor of the attendance status of a selected invitee in response to an invitation to a scheduled meeting. Steps 190 and 192 facilitates the location of the scheduled meeting on the invitor's calendar. If the meeting was located, the replier's or invitee's attendance status is updated in step 194 according to the reply which was prepared in response to the meeting notice. Thereafter, in step 196, a calendar alert is transmitted to the invitor utilizing the mail service to immediately inform the invitor of the invitee's status. Step 198 sets a return code to DONE and control is transferred to step 107 (FIG. 3) for further processing. If the meeting was not found on the invitor's calendar, the return code is set equal to ENQUEUE and control is transferred to step 107 for further processing.

Figure 9:
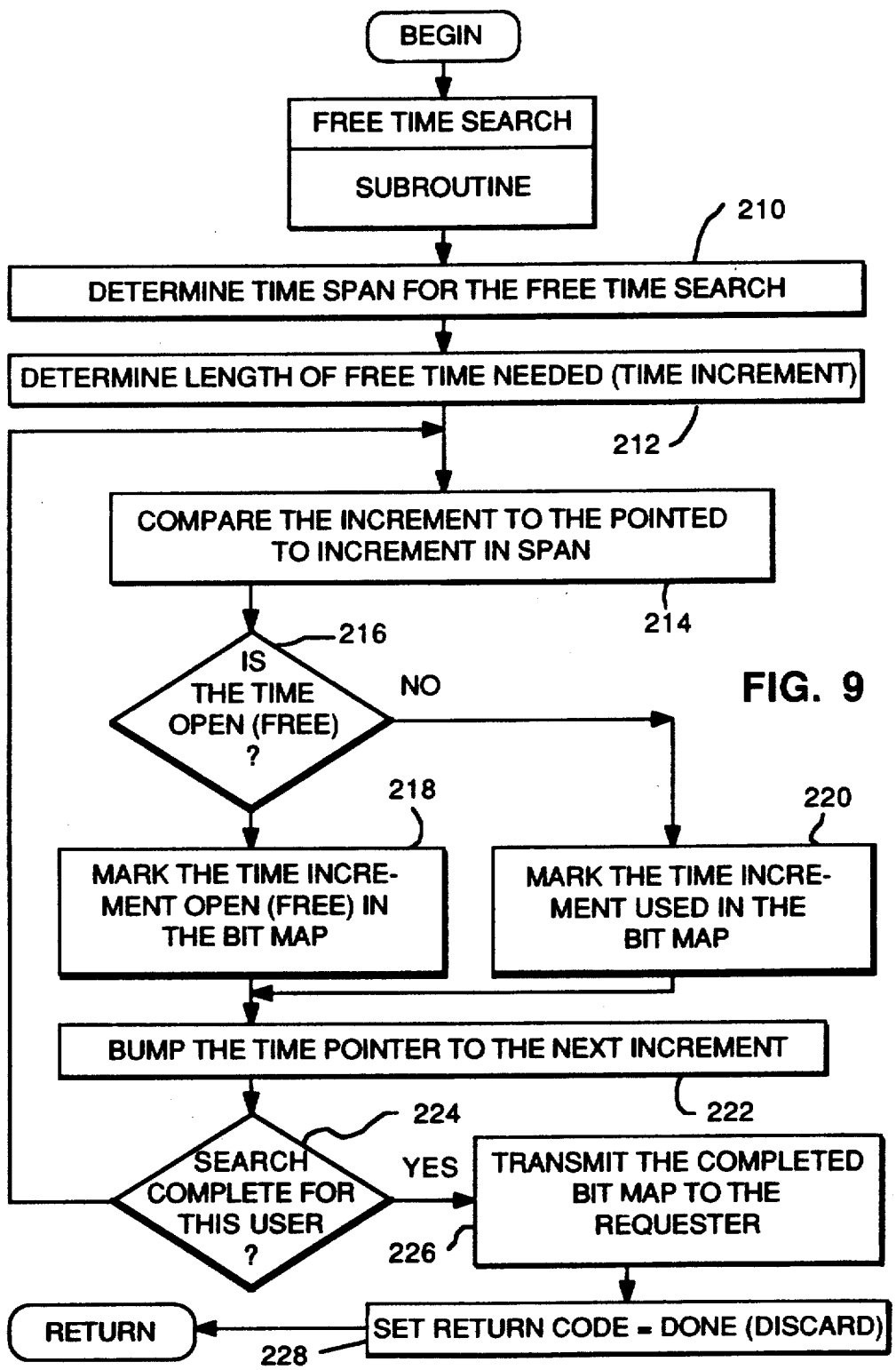

Referring to FIG. 9, there is shown a flow diagram for a free time search subroutine. In steps 210 and 212, a time span and a time increment or length of free time needed are specified by the invitor/caller of a scheduled meeting. Step 214 compares the time increment with the time intervals on a selected potential invitee's calendar. Step 216 determines whether there are any time intervals on the potential invitee's calendar which match the specified time increment. If there are time intervals which are available (open) on the potential invitee's calendar which match the time increment, the time increment is marked open in a bit map in step 218. If the time intervals found is not available, the time interval is marked not available (used) in the bit map. Step 222 moves a pointer to the next time interval on the potential invitee's calendar which matches the specified time increment. Step 224 determines whether the search has been completed for the selected invitee and continues the search for other open time intervals on the invitee's calendar until the search is completed. If the search is completed for the selected invitee, the bit map is transmitted to invitor/requestor in step 226. Step 228 sets a return code equal to DONE and transfers control to step 107 (FIG. 3).

In summary, an end user (invitor) who maintains a calendar on the information processing system 21 (FIG. 2) may schedule a meeting and invite other end users (invitees) who maintain respective calendars on the system to the meeting. The invitor sends each of the invitees a meeting notice or request. The present invention determines the current status of each of the respective invitees and automatically enters the scheduled meeting on the calendar of each invitee based upon the classification of the invitee set forth in the meeting notice. A log is maintained of each entry or attempted entry and its associated status for the invitor and each of the respective invitees. A reply, which sets forth the invitee's status in regard to the schedule meeting, is prepared and transmitted to the invitor. Subsequently, if a selected invitee's status changes in regard to the scheduled meeting, the invitee's calendar is automatically updated and the invitor is automatically informed of this status change.

While the invention has been shown and illustrated with reference to a preferred embodiment, it will be understood by those skilled in the art that various modifications may be made without departing from the spirit of the invention and scope of the appended claims.

We claim:

1. In an information processing system, a computer implemented method of entering an event, which is present on a first electronic calendar being maintained in the system, on a second electronic calendar being maintained in the system, said computer implemented method comprises the steps of:
   requesting in said system the scheduling of said event on said second electronic calendar being maintained by s second user by defining a time period of said event and a classificaton indicating the importance of the second user;
   determining by said system whether there are multiple entries on said second electronic calendar for the time period specified in said request:
   if there are not multiple entries on said second electronic calendar, automatically entering in said system said event on said second electronic calendar;
   if there are multiple entries on said second electronic calendar for the time of said event, entering on said second electronic calendar the events in priority based upon the classified importance of the second user; and
   transmitting in said system a reply to a first user indicating the status of said second electronic calendar user n regards to said request.

2. The method as recited in claim 1 wherein said automatically entering step includes the step of replacing said multiple entries with said event if the classificaton of said request is higher than the classifications of respective multiple entries.

3. The method as recited in claim 2 further includes the step of transmitting a reply to a third user defined by said multiple entries which sets forth the changed status of said second user if said multiple entries is replaced.

4. The method as recited in claim 1 wherein said reply transmitted to said first user is a first reply and further includes the step of transmitting a second reply to said first user indicating that the status of said second user has changed subsequent to the transmittal of said first reply.

5. In an information processing system, a computer implemented method of entering an event, which is present on a first electronic calendar being maintained in the system, on a plurality of electronic calendars being maintained in the system, said computer implemented method comprises the steps of:
   requesting in said system the scheduling of said event on said plurality of electronic calendars being maintained by respective users by defining a time period of said event and a classification indicating the importance of the respective user;
   determining by said system whether there are multiple entries on each of said plurality of electronic calendars for the time period specified in said request;
   for each of said plurality of electronic calendars, if there are not multiple entries automatically entering in said system said event on said electronic calendar;
   for each of said plurality of electronic calendars, if there are multiple entries for the time of said event entering on said electronic calendar the events in priority based upon the classified importance of the respective user; and
   transmitting in said system a reply to a first user indicating the status of said plurality of electronic calendar users in regards to said request.

6. The method as recited in claim 5 wherein said automtically entering step includes the step of replacing said multiple entries found for said time period with said event if the classification of said request is higher than the classifications of respective multiple entries.

7. The method as recited in claim 6 further includes the step of transmitting in said system a reply to an end user defined by said multiple entries found on each electronic calendar of said plurality of calendars setting forth the changed status of each of said respective users if said multiple entries are replaced.

8. The method as recited in claim 5 further includes the step of maintaining in said system a log of all calendar activity on said first and said plurality of calendars.

9. The method as recited in claim 5 wherein said reply transmitted to said first user is first reply and further includes the step of transmitting a second reply to said first user if the respective status of said respective users has changed subsequent to the transmittal of said first reply.

* * * * *